United States Patent
Brock et al.

(10) Patent No.: US 6,965,714 B2
(45) Date of Patent: Nov. 15, 2005

(54) INTEGRATED ASPHERIC OPTICAL COUPLER FOR RF PLANARIZED AUTOMATIC PHOTONICS PACKAGING

(75) Inventors: John C. Brock, Redondo Beach, CA (US); Dean Tran, Westminster, CA (US); Edward A. Rezek, Torrance, CA (US); Christian L. Marquez, Redondo Beach, CA (US); Michelle M. Hazard, Huntington Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 103 days.

(21) Appl. No.: 10/170,872

(22) Filed: Jun. 13, 2002

(65) Prior Publication Data

US 2003/0231828 A1 Dec. 18, 2003

(51) Int. Cl.$^7$ .................................................. G02B 6/32
(52) U.S. Cl. .............................. 385/33; 385/49; 385/52
(58) Field of Search ............................................ 385/33

(56) References Cited

U.S. PATENT DOCUMENTS

| | | | | |
|---|---|---|---|---|
| 5,324,954 A | * | 6/1994 | Oikawa | 250/559.3 |
| 5,471,552 A | * | 11/1995 | Wuu et al. | 385/49 |
| 5,853,960 A | * | 12/1998 | Tran et al. | 430/321 |
| 6,115,521 A | | 9/2000 | Tran | |
| 6,205,274 B1 | | 3/2001 | Zhou | |
| 6,243,508 B1 | * | 6/2001 | Jewell et al. | 385/14 |
| 6,542,672 B2 | * | 4/2003 | Jewell et al. | 385/49 |

OTHER PUBLICATIONS

Ostermayer, Jr., F.W.; Photoelectrochemical Etching of Integral Lenses on InGaAsP/InP Light–Emitting Diodes; Appl. Phys. Lett. 43(7); Oct. 1, 1983; pps. 642–644.

Althaus, Hans L.; Microsystems and Waferprocesses for Volumeproduction of Highly Reliable Fiber Optic Components for Telecom– and Datacom– Application; 1997 Electronic Components and Technology Conference; pps. 7–15.

Hamakawa, Yoshihiro; New Types of High Efficiency Solar Cells based on a–Si; Appl. Phys. Lett. 43(7); Oct. 1, 1983; pp. 644.

Ostermayer, Jr., F.W.; Photoelectrochemical Etching of Integral Lenses on InGaAsP/InP Light–Emitting Diodes; Appl. Phys. Lett. 43(7); Oct. 1, 1983; pps. 642–643.

* cited by examiner

Primary Examiner—John R. Lee
Assistant Examiner—Phillip A. Johnston
(74) Attorney, Agent, or Firm—Jones, Tullar & Cooper PC

(57) ABSTRACT

The invention relates to an optical, integrated alignment device for accurately aligning and efficiently coupling energy between in-plane optical devices. A semiconductor substrate is etched to include a groove for an optical fiber and a lens for passing an optical signal from a cut fiber to a photodetector. The etched semiconductor substrate may be used to pass an optical signal from a surface light emitting device to a cut fiber. The end of the optical fiber is cut at a slant that redirects an optical signal from the fiber through the lens or vice-versa. The lens focuses the optical signal onto a target.

20 Claims, 4 Drawing Sheets

INTEGRATED ASPHERIC OPTICAL COUPLER FOR RF PLANARIZED AUTOMATIC PHOTONICS PACKAGING

BACKGROUND OF THE INVENTION

The present invention relates, in general, to a photonics package incorporating a monolithically integrated alignment device for coupling optical energy between in-plane optical devices and to a method for producing the same. More specifically, the invention relates to a photonics package that incorporates an optical coupling and alignment device having an integral fiber groove, lens aperture and monolithic aspheric lens.

Data in optical communication systems is often transmitted in the form of optical signals through an optical fiber terminating in a photonics device such as a receiver, transponder, transceiver, or the like. The data is projected from an optical fiber, for example as a light beam, directed onto a photonic die where the data is received by a photodetector and converted to a corresponding radio frequency (RF) electrical signal. However, data can easily be lost due to improper alignment between the fiber and the photodetector or through light divergence, although both the alignment and divergence problems can be minimized where the fiber and the photodetector are in close proximity or where a lens can be used to focus the optical signal. In general, these optical coupling systems are increasingly prevalent so that the need for simplified assembly processes for micro-optical coupling systems is increasingly important.

There are presently two broad approaches to photonics packaging. In the first, an optical fiber is aligned to be perpendicular to a photodetector; in the second, the fiber is in-plane (i.e. parallel) to the photodetector. In the first construction, wherein light is projected from fiber directly onto the photodetector, the photodetector and the fiber must be optically aligned in three mutually perpendicular planes ((x-y), (x-z), and (y-z)), which complicates the assembly process. Moreover, such an arrangement can be problematic for high frequency data transfer because it requires a longer wire bonding or transmission line, and this reduces device performance at high frequency operation. This design configuration also results in the optical input being perpendicular to the RF signal output, and this requires much more space in a module. These performance and size issues make this approach commercially less desirable, and this is the disfavored, if not unacceptable, approach for many applications where it is advantageous to have the fiber input and RF output substantially coplanar.

In the second construction, where the fiber is parallel to the photodetector surface, the optical signal from the fiber must be redirected in order to impinge on the photodetector. One known method for redirecting the optical signal in this type of alignment device is to reflect the optical signal off a mirror in a direction perpendicular to the axis of the fiber. However, there are several problems with this method. Using a discrete mirror (an additional element needing alignment) introduces an indirect connection between the fiber and photodetector, causing difficulty during alignment, raising costs due to the need for a more precise construction, and reducing reliability. Further, in order to accurately direct the optical signal onto the mirror, and then to the photodetector, the optical fiber holder has to incorporate a lens. Therefore, there are certain commercial advantages to eliminating the intermediate mirror.

Another method for redirecting an optical signal from an optical fiber onto the surface of a plane perpendicular to the axis of the fiber involves cutting the terminal end of the fiber at an angle so that the signal in the fiber is deflected out in a direction approximately perpendicular to the axis. The fiber is then positioned so that the signal exiting the fiber passes through a lens, in order to align and focus the signal. This design is an improvement over prior devices, but since high frequency optical signals require miniscule photodetectors, the optical fiber must be in extremely close proximity to the photodetector to minimize light divergence and to maximize photodetector responsivity. Further, the three components; namely, the fiber, lens, and photodetector, have to be precisely located with respect to each other to ensure reliable coupling, and this is difficult to accomplish.

In each of the configurations discussed above, the photonic package consists of several independently fabricated micro-optical components, including an optical fiber, a photodetector, a mirror, a lens and and a substrate or microbench on which the components are assembled, as well as bonding materials to connect the components, and frequently all were assembled manually, which is not efficient. Although automated assembly could be used, it fails to achieve the needed alignment precision. Accordingly, a simple construction for optically aligning a photodetector in a parallel orientation with an optical fiber is needed.

SUMMARY OF THE INVENTION

The present invention relates to an improved photonics package for micro-optical systems, the package including an assembly for directing optical signals between first and second optical devices, one of which may be a source of such signals and the other of which may be a photodetector. The signals pass through an optical fiber and an optical coupler, or alignment device, to optically couple the fiber and a photonics die. In one embodiment, a light source directs light into the optical fiber, and this light is directed by the coupler to a photodetector on the die. Alternatively, the photonics package can be used to transmit light from a light transmitter on the die through the optical coupler to the optical fiber.

In greater detail, and in a preferred embodiment of the invention, the photonics package of the invention is formed by first fabricating a monolithic coupler, or alignment device from a substrate by a conventional etching process. The alignment device incorporates an integral fiber groove on its top surface, an integral aspheric lens, and an integral recessed receiver portion on its bottom surface for receiving a photonic die and for positioning it under the aspheric lens. In one form of the invention, the die includes a photodetector region which is located to receive an optical signal directed into the alignment device through an optical fiber placed in the fiber groove. The groove and fiber are generally parallel to the surface of the aspheric lens (i.e. they are "in-plane"), with the terminal end of the optical fiber extending out of the groove sufficiently to be located above the lens. In this first form of the invention, the end of the fiber is cut at an angle to redirect an optical signal, propagating axially in the fiber, out of the fiber in a direction substantially perpendicular to the fiber's axis. The fiber cut may be polished and a high reflectivity coating added. The fabrication of optical fibers having a forty-five degree angle cut and the location of such fibers in a v-groove is illustrated in U.S. Pat. No. 5,324,954, which is hereby incorporated herein by reference. In accordance with this form of the invention, the optical signal from the fiber is directed through, and is focused by, the aspheric lens and is received by the photodetector region on the precisely positioned photonic die. In a second form of the invention the photonic die may incorporate a light emitter, such as a vertical cavity surface emitting laser diode (VCSEL) or surface light emitting diode (SLED), aligned with the aspheric lens for directing light signals into the optical fiber by way of the angled terminal end of the fiber. The integration of the various components of the alignment device provides for an easy-to-align, very small optical connector with reduced complexity and reduced manufacturing costs.

In accordance with a preferred form of the invention, the monolithic alignment device with its included aspheric lens is fabricated within a substrate wafer by: 1) coating the substrate with a photoresist material for photolithographically patterning the substrate, 2) etching the substrate through the pattern using a standard semiconductor etching process to form a fiber groove on the top surface of the substrate and to form a top surface of the aspheric lens, 3) flipping the substrate over, and coating the bottom surface with a photoresist material for photolithography, 4) etching the bottom surface of the substrate, using a standard semiconductor etching process to form a recess on the bottom substrate surface and to form a bottom surface of the aspheric lens, and 5) coating both sides of the resulting aspheric lens with a thin film or film of material to make the input and output surfaces of the lens anti-reflective (AR). The preferred etching process is similar to that illustrated in U.S. Pat. No. 5,853,960, which is hereby incorporated herein by reference.

A final step for fabricating the alignment device includes metalizing the fiber groove and the bottom of the substrate block, as with solder. Thereafter, an optical fiber having an angled terminal end is secured in the groove with the optical axis of the angled surface of the fiber aligned with the optical axis of the lens, and a photonic die is positioned in the recess so that a photodetector region or a surface light emitting active area on the die is aligned with the optical axis of the lens, and thus with the optical signal axis of the fiber. The monolithic alignment structure assures accurate and reliable alignment of the optical fiber, the lens, and the photodetector or surface light emitting device, and lends itself to automatic assembly procedures.

Overall, the ability to form a monolithic, compact and simple optical coupling system for micro-optical devices has several advantages. For example, constructing all the components of an alignment device from identical material in a single process lowers assembly costs, reduces alignment problems during assembly and overcomes problems caused in earlier devices by unequal thermal expansion between components. Moreover, complex coupling and alignment schemes can be eliminated, reducing the number of components and the complexity of the process of manufacturing the device. A monolithic structure also permits a closer proximity of the fiber, lens, and photodetector light emitters, which allows for more accurate alignment, a decrease in the time required for alignment, and more efficient packaging of optical electronics systems. The assembly of the package can be automated, resulting in higher volume manufacturing and higher reproducibility.

In summary, a monolithic micro-optical device incorporating a photonics package in accordance with the present invention efficiently addresses various problems associated with optical communication applications and improves upon the prior art by providing a commercially advantageous product. The device eliminates the need for manual assembly and improves reliability and accuracy by simplifying prior devices.

BRIEF DESCRIPTION OF DRAWINGS

The foregoing, and additional objects, features, and advantages of the present invention will become apparent to those of skill in the art from the following detailed description of a preferred embodiment thereof, taken in conjunction with the accompanying drawings, in which.

DETAILED DESCRIPTION OF THE APPLICATION

Figure 1:
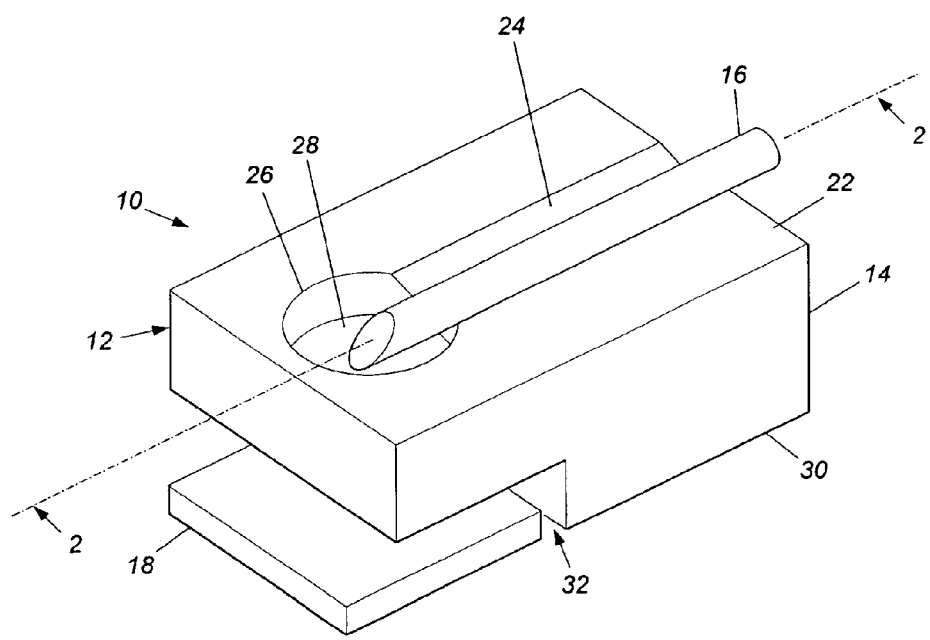
FIG. 1 is a perspective view of a photonics package including an alignment device fabricated in accordance with the present invention.
Figure 2:
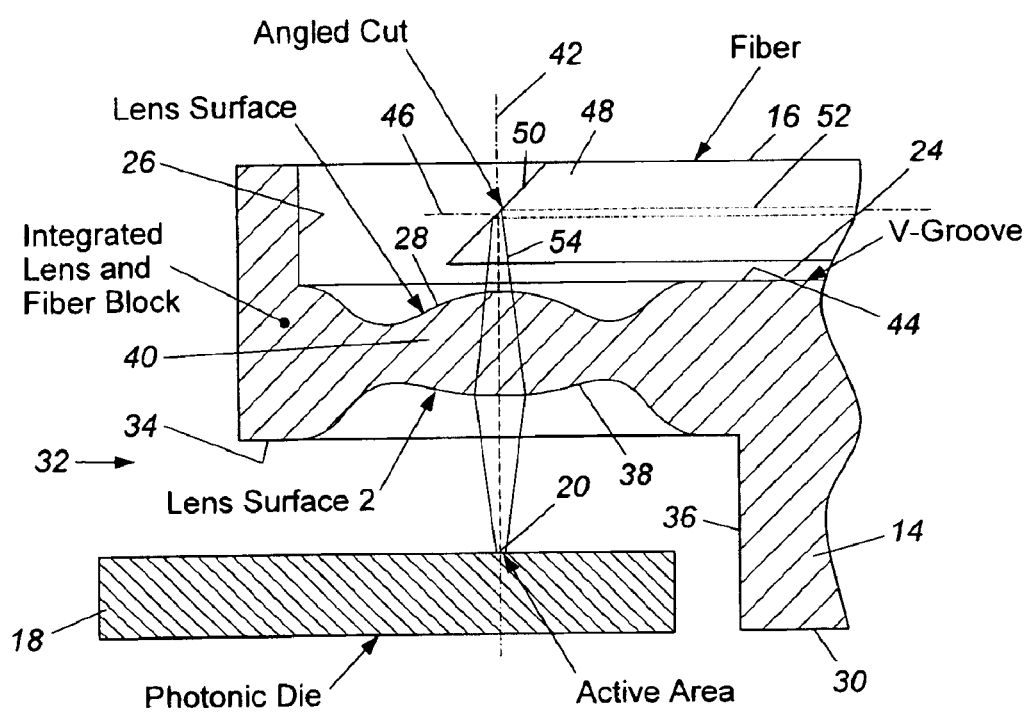
FIG. 2 is a cross-sectional view taken along lines 2—2 of the photonics package of FIG. 1.
Figure 3:
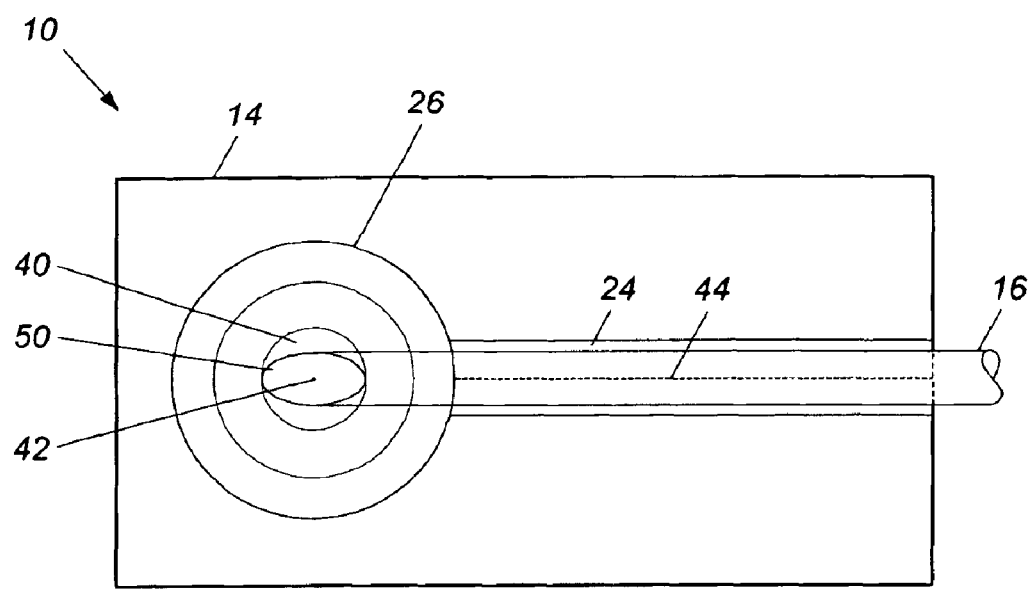
FIG. 3 is a top plan view of the photonics package of FIG. 1.

Turning now to a more detailed description of the present invention, there is illustrated in FIGS. 1, 2 and 3 a photonics package 10 which includes a semiconductor monolithic optical coupler, or alignment device 12 fabricated from a substrate 14 by a standard semiconductor etching process. This process permits fabrication of the specific features needed for the alignment device 12, as will be described below.

More specifically, the photonics package 10, which may be used, for example, in a communications or data network application for converting optical signals to corresponding electrical signals, or vice-versa, includes the alignment device 12, an optical fiber 16 supported by the alignment device, and a photonic die 18 which includes an optically active region 20, which in one embodiment may be a photodetector. In another embodiment, the region 20 may instead be a light emitter such as a VCSEL or SLED. The alignment device 12 is a monolithic structure that is created (as further described below) from substrate 14 using conventional semiconductor fabrication techniques. The substrate is etched on its top surface to form a fiber groove 24, which may be generally V-shaped or U-shaped in cross-section, a lens aperture 26, and a top lens surface 28 within aperture 26. Thereafter, the bottom surface 30 of the substrate is etched to form a receiver section 32 which may be, in the preferred embodiment, in the form of an L-shaped groove or recess having a first, or horizontal, surface 34 and a second, or vertical, surface 36 which forms a ledge or shoulder in the bottom of the substrate. The surface 34 is further etched to form a bottom lens surface 38. During the etching process for fabricating the alignment device, conventional photolithographic steps are used to self-align the top and bottom lens surfaces 28 and 38 to produce in the substrate an aspheric lens 40 centered in aperture 26 along lens axis 42.

The receiver section 32 is precisely shaped and located during the etching process to receive the photonic die 18 and to position it so that its optically active region 20, which may be a light emitter or photodetector, is positioned in alignment with lens axis 42. Although the Figures illustrate the receiver section as being L-shaped in cross-section, with the die 18 spaced from the optical coupler, or alignment device 12, it will be understood that the receiver section preferably is shaped as needed to snugly receive and secure the die 18 in optical alignment with lens 40.

Preferably, the groove 24 in the top surface of the substrate is V-shaped in cross-section, although it may be generally U-shaped, with the base 44 of the groove aligned with, and by extension intersecting, the axis 42 of the lens. When an optical fiber 16 is placed in the groove 24, the V or U shape of the groove precisely aligns the longitudinal axis 46 of the optical fiber in the coupler so that axis 46 intersects lens axis 42. The terminal end 48 of the fiber 16 is cut, polished and HR coated with metals or other oxide materials. The cut is angled with respect to fiber axis 46 to produce an angled end surface 50 which redirects optical signals 52 propagating in the optical fiber out of the fiber, as a beam 54 in perpendicular alignment relative to the fiber's axis. The cut is preferably a forty-five degree angle with the axis of the fiber, although angles of between 35 and 54 degrees may be used. The end 48 of the fiber 16 is positioned in the lens aperture 26 so that the center, or axis, of surface 50 is aligned with lens axis 42, and the fiber is rotated so that the surface 50 directs beam 54 along axis 42 to pass through the lens 40. The lens 40 focuses the beam 54 onto the photonic die 18 containing a photodetector region 20. It will be understood that if the optically active region 20 is a surface light emitting device, then light from region 20 will be directed along the axis 42 of the lens into the fiber 16.

With the coupler of the present invention, accurate and reliable alignment of an optical device such as fiber 16 with an optically active region 20 is easily obtained by simply positioning the fiber 16 longitudinally in groove 24 so that the center of end surface 50 is aligned with the center line 42 of lens 40, and rotating the fiber to a position that will ensure that an output light beam 54 is directed into the center of the lens. Although beam 54 tends to diverge, as illustrated in FIG. 2, weakening the signal strength, the monolithically integrated lens 40, which is aspheric in the preferred embodiment, concentrates the light, improving alignment and signal strength characteristics. FIG. 3 more clearly shows the alignment of the fiber 16 in the fiber groove 24, so that the end 50 of the fiber is in the lens aperture 26 and centered on center line 42. A suitable light source (not shown) for supplying light to the coupler/alignment device 12 may be a laser source such as a diode laser, a photodiode, or the like coupled to fiber 16 either directly or through a suitable waveguide or additional optical fibers.

Figure 4:
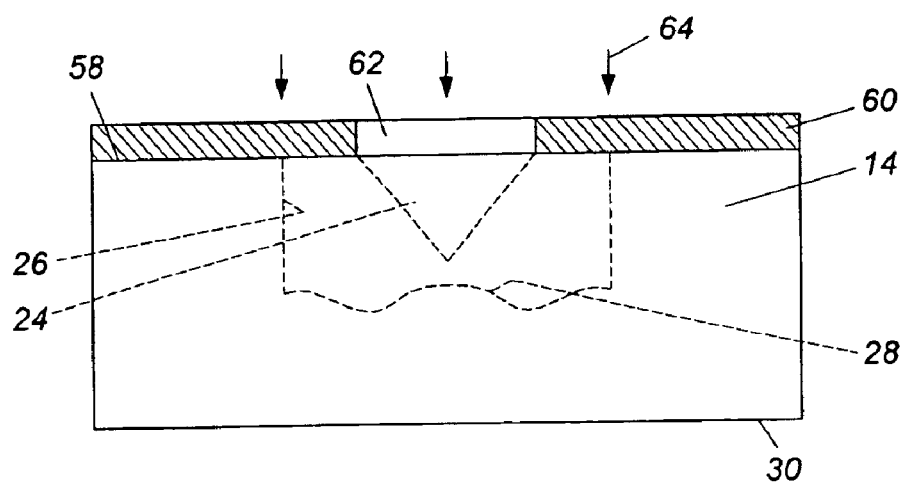
FIGS. 4–6 illustrate process steps for fabricating the device of FIG. 1.
Figure 5:
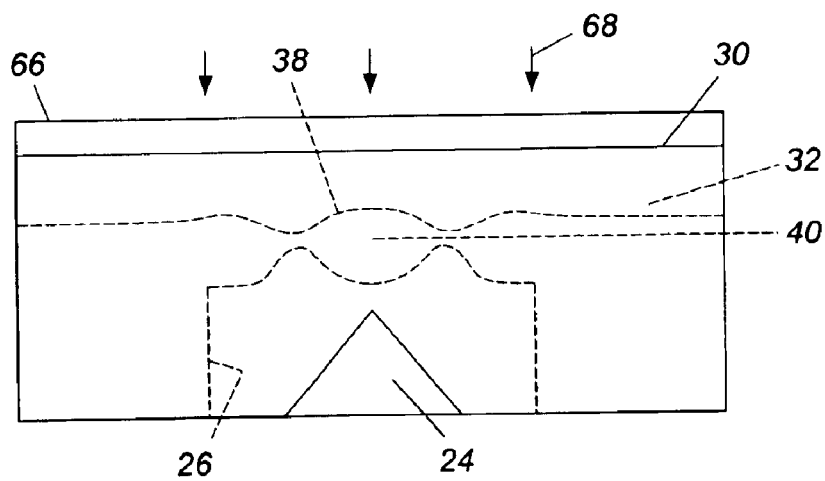
Figure 6:
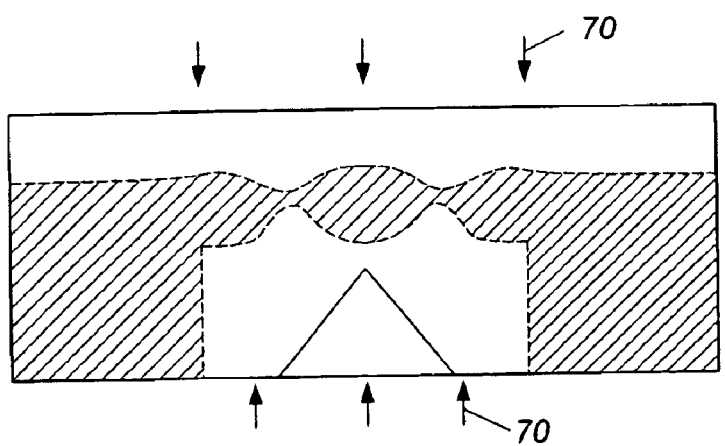

A typical process for producing the monolithic optical alignment device 12 of the invention is described in U.S. Pat. No. 5,853,960, as discussed above. Generally, and in accordance with a preferred form of the invention, the monolithic aspheric lens is fabricated within the substrate wafer by the process illustrated in FIGS. 4–6. This process includes coating the top surface 58 of substrate 14 with a photoresist material 60 for photolithographically producing a pattern 62 on the substrate. The substrate is etched (arrows 64) using a standard semiconductor etching process to form the fiber groove 24, the aperture 26, and the top surface 28 of the aspheric lens 40 (FIG. 4). The substrate 14 is turned over (FIG. 5) and the bottom surface 30 is coated with a photoresist material 66 for photolithography. The substrate is again etched (arrows 68) using a standard semiconductor etch process to form recess 32 on the substrate surface 30 and the second surface 38 of the aspheric lens 40. The resulting aspheric lens 40 is coated on both sides (arrows 70 in FIG. 6) with antireflectivity materials. A final step includes metalizing the fiber groove and the bottom of the substrate block with solder, for example, to allow an optical fiber to be readily fastened to the coupler. The substrate 14 may be any high refractive index semiconductor, such as a Group III-V semiconductor, which has unique crystal planes that allow for preferential etching, and further may be, for example, Gallium Arsenide, Indium Arsenide, Gallium Phosphide, or Silicon (Si). In the preferred embodiment, the wafer consists of Indium Phosphide (InP). In the case of wavelengths used for commercial telecommunications, a silicon wafer preferably is used, followed by the a firing process after etching the substrate to smooth out the lens surface before the AR coating step.

Although the present invention has been described in terms of a preferred embodiment, it will be understood that numerous variations and modifications may be made without departing from the invention. Thus, for example, the substrate can take numerous shapes other than the generally rectangular shape illustrated, and the photonics package and alignment device could use some other mechanism for aligning and securing the fiber over the integrated lens. Furthermore, the type of lens formed on the semiconductor substrate wafer can be aspherical, semi-spherical, semi-cylindrical, Gausian-cylindrical, binary, Fresnell, refractive, or diffractive, as dictated by the mask pattern. The light source for the coupler could be a waveguide device, diode laser, optical fiber, photodiode, or optical integrated circuits. Thus, it is to be understood that within the scope of the appended claims, the invention may be practiced otherwise than as specifically described above.

What is claimed is:

1. A monolithic alignment device for a photonics package for coupling light between first and second optical devices, comprising:
   a substrate;
   a groove etched on a first side of said substrate for receiving a first optical device;
   an integrated lens etched in said substrate, said lens having an optical axis aligned with said groove to allow an optical signal to pass between said first side of the substrate and a second side of said substrate along an optical path;
   a recess in a second side of said substrate for positioning a second optical device in said optical path; and
   wherein said groove aligned perpendicular to said optical axis.

2. The alignment device as recited in claim 1, wherein said first optical device is an optical fiber propagating light, and said second optical device is a photodetector.

3. The alignment device as recited in claim 1, wherein said first optical device is an optical fiber and said second optical device is a surface light emitting device.

4. The alignment device of claim 1, wherein said first optical device is a source of light, and said second optical device includes a photosensitive region of a photonics device.

5. The alignment device as recited in claim 1, wherein said substrate comprises a silicon material.

6. The alignment device as recited in claim 1, wherein said substrate comprises a III–V semiconductor material.

7. The alignment device as recited in claim 6, wherein the substrate comprises indium phosphide.

8. The alignment device as recited in claim 1, wherein said lens is an aspheric lens.

9. The alignment device as recited in claim 1, wherein said fiber groove provides a channel for positioning an optical fiber therein.

10. The alignment device of claim 9, further including a recess on said second side of said substrate, said recess being shaped to receive a photonic die carrying said photodetector.

11. The alignment device of claim 9, further including a recess on said second side of said substrate, said recess being shaped to receive a photonic die carrying a surface light emitting device.

12. The alignment device of claim 11, further including a lens aperture formed in said first side of said substrate, said lens being formed in said aperture and extending through said substrate recess on said second side of said substrate.

13. A photonic package, comprising:

a substrate;

a fiber groove etched on a first side of said substrate;

an integrated lens etched in said substrate, said lens having an optical axis;

a recess etched in a second side of said substrate;

a photonics die mounted in said recess and incorporating an optical device aligned with said optical axis; and an optical fiber located in said groove and having a longitudinal axis and a sloped surface at a terminal end, said sloped surface and said longitudinal axis intersecting said optical axis.

14. The package of claim 13, wherein said fiber groove is V-shaped.

15. The package of claim 13, wherein said fiber groove is U-shaped.

16. The package of claim 13, further including a lens aperture formed in said first side of said substrate, said integrated lens being integrally formed from said substrate in said aperture, said lens having its optical axis extending through said substrate from said aperture to said recess on said second side of said substrate.

17. The alignment device of claim 16, wherein said sloped fiber surface is at approximately a 45° angle with respect to said longitudinal axis of said fiber and with respect to said optical axis to direct optical signals propagating in said fiber through said lens to said photodetector.

18. The alignment device of claim 16, wherein said sloped fiber surface is at an angle of between 35 to 54 degrees with respect to said longitudinal axis of said fiber and said optical axis to direct optical signals propagating in said fiber through said lens to said photodetector.

19. The alignment device of claim 18, wherein said longitudinal axis of said fiber and said optical axis of said lens form a continuous optical path between said optical fiber and said photonics die.

20. A monolithic device for a photonics package, comprising:

a substrate;

a groove etched on a first side of said substrate;

an integrated lens etched in said substrate, said lens having an optical axis, said lens aligned with said groove to allow an optical signal to pass between said first side of the substrate and a second side of said substrate along an optical path;

a recess etched in said second side of said substrate;

a photonics die mounted in said recess and incorporating an optical device aligned with said optical axis; and an optical fiber located in said groove and having a longitudinal axis and a sloped surface at a terminal and, said sloped surface and said longitudinal axis intersecting said optical axis so that said fiber, said lens and said die are parallel.

* * * * *